United States Patent [19]

Kohn

[11] Patent Number: 4,900,623
[45] Date of Patent: Feb. 13, 1990

[54] ULTRATHIN POLYMETHYLMETHACRYLATE POLYMER FILMS

[75] Inventor: Rachel S. Kohn, Springfield, N.J.

[73] Assignee: Hoechst Celanese Corporation, Somerville, N.J.

[21] Appl. No.: 181,629

[22] Filed: Apr. 14, 1988

Related U.S. Application Data

[62] Division of Ser. No. 917,806, Oct. 10, 1986, Pat. No. 4,765,939.

[51] Int. Cl.$^4$ .................... B32B 27/30; B29C 39/02; C08F 120/18
[52] U.S. Cl. .................................. 428/336; 428/522; 264/298; 526/329.7
[58] Field of Search ................ 428/522, 336; 264/298; 526/329.7

[56] References Cited

U.S. PATENT DOCUMENTS 4,374,891  2/1983  Ward ................................... 428/220
4,765,939  8/1988  Kohn ................................. 526/329.7

Primary Examiner—P. C. Ives
Attorney, Agent, or Firm—Lynch, Cox, Gilman & Mahan

[57] ABSTRACT

Disclosed herein are pinhole-free, ultrathin, polymethylmethacrylate films having thicknesses of about 400 angstroms or less and a process to prepare them. The films find particular utility in separatory applications.

17 Claims, No Drawings

ULTRATHIN POLYMETHYLMETHACRYLATE POLYMER FILMS

This is a divisional of co-pending application Ser. No. 917,806 filed on Oct. 10, 1986, now U.S. Pat. No. 4,765,939.

In U.S. Pat. No. 2,760,233, a process is disclosed for preparing curved polymer sheets from methacrylic acid ester polymers. However, no specific solvent mixtures and ratios suitable for casting ultrathin, pinhole-free, polymethylmethacrylate films are disclosed nor are any film thicknesses provided.

U.S. Pat. No. 3,551,244 discloses a process for preparing on a water surface films having a thickness between 0.05 and 5.0 microns (i.e. between 500 and 50,000 angstroms). The patent discloses that certain esters, such as ethyl acetate, are suitable casting solvents and states that polymethylmethacrylate films can be prepared. However, no specific solvent mixtures and ratios suitable for casting pinhole-free, polymethylmethacrylate films with thicknesses less than 400 angstroms are disclosed.

U.S. Pat. No. 3,767,737 discloses a method for producing allegedly nonporous, alkyl methacrylate polymer membranes having thicknesses between 0.005 and 0.05 mils on a support liquid. In the only relevant example, it is unclear whether polymethylmethacrylate is employed alone or in combination with other polymers to prepare a film. Nevertheless, specific mixtures of solvents and appropriate solvent ratios for preparing pinhole-free, polymethylmethacrylate films having thicknesses of 400 angstroms or less are not disclosed.

U.S. Pat. Nos. 4,155,793, 4,279,855 and 4,374,891 disclose processes for preparing substantially void-free, ultrathin, permeable polymeric membranes having a thickness of 500 angstroms or less. Alkyl methacrylate polymers are asserted to be suitable for use in the disclosed process. However, only films prepared from organopolysiloxane-polycarbonate interpolymers mixed with polyphenylene oxide are disclosed in the examples. Polymethylmethacrylate films are not disclosed nor are suitable solvent mixtures and ratios for casting polymethylmethacrylate films having thicknesses of 400 angstroms or less.

Other patents, such as U.S. Pat. Nos. 2,631,334, 2,689,187, and 4,393,113, also disclose ultrathin polymeric films. However, no polymethylmethacrylate films are disclosed.

In the prior art, the preparation of monolayer polymethylmethacrylate films, which are one molecule thick, by depositing polymethylmethacrylate solutions on water is known. (See for example "On-line Diagnostics for Langmuir-Blodgett Film Growth," by Stephen Kowel, et al., Thin Solid Films, 132 (1986)). Such films are commonly called Langmuir-Blodgett films. However, such films are not free-standing films and are generally removed from the casting surface by affixing them to a substrate, such as glass.

In the prior art, pinhole-free, polymethylmethacrylate, free-standing films with thicknesses of less than 400 angstroms generally have not been cast. Usually, prior art films with thicknesses of less than 400 angstroms that are cast have holes and other macroscopic defects.

Therefore, it is an object of this invention to prepare ultrathin polymethylmethacrylate polymer films.

It is a further object of this invention to prepare pinhole-free, polymethylmethacrylate polymeric films.

It is also an object of this invention to prepare free-standing, polymethylmethacrylate films having thicknesses of 400 angstroms or less.

These and other objects are obtained by the products and process of the present invention.

SUMMARY OF INVENTION

The instant invention provides a process for preparing pinhole-free, ultrathin, free-standing, polymethylmethacrylate films having thicknesses of about 400 angstroms or less. The films are prepared by dissolving a polymethylmethacrylate polymer in a suitable mixture of alkyl acetates, such as a 1:1 by volume ratio of ethyl acetate: pentyl acetate, to form a polymeric solution, casting the solution on water to form a free-standing film, and removing the film from the water. The ultrathin films of the present invention can be used in separatory applications and as drug release membranes for the controlled release of drugs.

DETAILED DESCRIPTION OF INVENTION

The preparation of polymethylmethacrylate is well known in the prior art. The preferred means of polymerization is free-radical polymerization utilizing peroxides, hydroperoxides, or azo catalysts. These compounds are soluble in the methylmethacrylate monomers, serve as initiators, and permit the reaction and the molecular weight of the polymethylmethacrylate product to be controlled. The initiator is generally present in low quantities, such as 0.1 to 0.5 percent by weight based upon the total weight of the polymer solution.

It is preferred to use azo compounds, such as azodiisobutyronitrile, because of their high initiating efficiency. In addition, their nonoxidizing nature avoids the formation of occasional peroxide crosslinks with the polymer that may result when a peroxide initiator is employed. Hydroperoxides are subject to chain transfer and thereby lower the molecular weight and reduce the efficiency of the initiator.

If peroxides are utilized, they can be activated by the addition of tertiary aromatic amines, thus enabling polymerization to proceed rapidly at lower temperatures. The resulting polymer products can be discolored, but the addition of a promoter, such as thiophenol, can eliminate discoloration when peroxides are utilized.

If oxygen is present in the reaction system, it will affect the reaction rate and the nature of the products because methacrylate peroxides are produced in a side reaction. Consequently, polymerization is generally conducted in the absence of oxygen, either by bulk polymerization in a fuel cell or chamber or by utilizing an inert atmosphere.

A considerable amount of heat is released during polymerization and must be dissipated to avoid uncontrollable exothermic reactions. Heat can be dissipated by refluxing the solvent when a solution system is used or by stirring in a cooling bath or jacket.

Polymerization is conducted at temperatures up to about 100° C. For example, when 0.2 percent by weight benzoyl peroxide based upon the total weight of the polymer solution is employed, the reaction temperature is about 60° C.

The molecular weight of polymethylmethacrylate can be controlled by adjusting the concentration and activity of the initiator, the concentration of monomer, and the temperature. Generally, the higher each of these is, the higher the molecular weight. In addition, the average molecular weight of polymethylmeth-acrylate increases during polymerization.

The polymethylmethacrylate polymers that can be cast as ultrathin films are high molecular weight polymers having molecular weights, $M_w$, greater than about 250,000, such as in the range of about 500,000 to about one million. A suitable polymer is the high molecular weight polymethylmethacrylate polymer available from the Aldrich Chemical Company, Inc. Films cast from polymethylmethacrylate having a molecular weight of about 250,000 or less are quite fragile and tend to break when lifted from the casting surface.

The solvents suitable for casting polymethylmethacrylate films are lower weight alkyl acetates, such as methyl, ethyl, propyl, butyl, pentyl, and hexyl acetate. It is preferred not to use alkyl acetates having a higher weight than hexyl acetate because problems may develop when trying to evaporate higher weight alkyl acetates.

The solution used for casting polymethylmethacrylate films should contain a mixture of alkyl acetates. There must be a lower and a higher alkyl acetate in the solution in order for the casting solution to spread uniformly upon the casting surface.

The ratio of the solvents in the solution is critical. Some suitable solvent ratios are about a 4:4:6:6 to about a 6:6:4:4 by volume ratio of ethyl acetate: propyl acetate: butyl acetate: pentyl acetate, preferably about a 9:9:11:11 to about a 11:11:9:9 ratio, and most preferably about a 1:1:1:1 ratio. Another suitable solvent ratio and mixture is about a 4:6 to about a 6:4 by volume ratio of ethyl acetate: pentyl acetate, preferably about a 9:11 to about a 11:9 ratio, and most preferably about a 1:1 ratio. Substantial deviations in the preferred ratios should be avoided. The reason is that the solvents do not spread at the same rate on water, and the solvent ratio represents the optimum mixture of solvents so that uniform spreading on water will result. If the ratios are altered substantially, one solvent may spread more quickly than another solvent, and the result will be a film with a non-uniform thickness.

After a suitable solvent mixture is prepared, the polymethylmethacrylate polymer is dissolved in the solvent mixture to prepare a casting solution. The casting solution should contain about three to about twelve percent by weight of the polymer, preferably about four to about seven percent and most preferably about five to about six percent. Generally, the greater the amount of polymer in the casting solution, the thicker the film will be. Conversely, the lower the amount of polymer, the thinner the film will be. However, if the percent by weight is too low, such as below three percent by weight, the film will be too fragile to lift from the casting surface and will contain defects, such as holes. The polymer solution can be used immediately after preparation or stored in appropriate containers, such as teflon bottles, at room temperature.

It is possible to cast polymethylmethacrylate films from a polymer solution containing polymethylmethacrylate polymers and a minor amount of other polymers which are compatible in film form with the polymethylmethacrylate polymers and which can be dissolved in the casting solution. When other polymers are mixed with polymethylmethacrylate, the amount of polymethylmethacrylate employed should be 80 percent or more by weight based upon the total weight of polymers dissolved in the polymeric solution. Examples of these polymers include styrene, acrylic ester, methacrylic ester, and vinyl polymers and copolymers, such as polyvinylidene chloride.

Before the polymeric solution is cast into films, it is preferred to filter the solution using microfilters and/or membranes. Filtration of the polymer solution before casting substantially reduces imperfections in the cast films. For example, the solution can be suction filtered through glass microfiber filters and then passed through one or more Millipore microfiltration embranes having pores with diameters of about one to five microns and available from the Millipore Corporation. It is preferred to pass the solution through a series of Millipore membranes, the first membrane having a pore size of five microns, the second of three and the last of one micron. In order to enable the solution to pass through the smaller pore size membranes, it is usually necessary to apply pressure. For example, a Millipore stainless 47 mm pressure holder operated at a pressure up to 100 psi argon can be employed. The amount of pressure applied will depend upon the viscosity of the solution and the pore size of the membrane.

After filtration, the solution is cast on water at or near room temperature. As used herein, the term "water" includes aqueous solutions containing minor amounts (e.g. one percent or less by weight based upon the total weight of the solution) of organic solvents (e.g. lower weight alcohols) the presence of which does not adversely affect the properties of the films cast on the solution. The addition of such organic solvents may facilitate the removal of the film from the water's surface. The water is contained in any suitable walled container. For example, an appropriate container is an aluminum container having the dimensions of $12'' \times 12'' \times 3''$. Preferably, the walls of the container are outwardly sloped at about a 20 degree incline to reduce reflected surface waves which can damage the film. Such waves are produced when the polymeric solution is placed on the water's surface or by air currents and external vibrations. Most preferably, the inside walls are teflon coated so that films are less likely to stick to the sides of the container.

The solution is cast by depositing a drop of the polymer solution upon the water's surface. The solution usually spreads over the surface of the water in three seconds or less. The solution is allowed to stand until a sufficient amount of the solvent has evaporated to form a free-standing film. As used herein, the term "free-standing film" refers to a film which has a physically stable shape and is dimensionally stable on its casting surface and can be removed from the casting surface without having to provide support over the entire surface area of the film. The time of evaporation Will depend upon the solvents used but generally is between 20 and 30 seconds and rarely more than 60 seconds.

After the solvent has evaporated, the film is lifted from the liquid surface using any suitable means, such as a $2'' \times 3''$, thin, aluminum plate having a 30 millimeter inner diameter hole in it and a handle on one end of the plate. When the aluminum plate touches the surface of the film, the film adheres to the aluminum plate and may readily be removed from the surface of the water.

The films of the instant invention are generally round, ultrathin, pinhole-free, uniform, colorless films having a diameter of about four to about six inches and a thickness of about 400 angstroms or less. As used herein, the term "ultrathin film" refers to a film having a thickness of 400 angstroms or less, and the term "pinhole-free film" refers to a film having no holes one micron or more in diameter.

The films of this invention can be used as gas separation membranes and in end uses where a controlled release of drugs is needed.

The invention is illustrated by the following examples in which all percentages are by weight unless otherwise specified.

EXAMPLE 1

A polymer solution was prepared containing six percent by weight polymethylmethacrylate dissolved in a 1:1 by volume mixture of ethyl acetate:pentyl acetate by magnetically stirring the solvents and the polymer at room temperature for five hours. The polymethylmethacrylate polymer had a molecular weight, $M_w$, of about one million and was obtained from the Aldrich Chemical Company, Inc.

After the polymer was dissolved, the polymer solution was suctioned filtered through Whatman GF/D glass microfiber filters having a particle retention size of 2.7 microns and available from Fisher Scientific and then passed through three microfiltration membranes obtained from the Millipore Corporation. The first membrane was a Mitex polytetrafluoroethylene membrane filter having a pore size of five microns. The second and third membranes were Fluoropore polytetrafluoroethylene membranes having pore sizes of three microns and one micron, respectively. A Millipore stainless 47 millimeter pressure holder operated at a pressure sufficient to force the solution through the membranes was employed.

After filtration, a drop of the polymer solution was deposited on water contained in a square aluminum container measuring 12"×12"×3" and having teflon coated walls which were sloped outwardly at a 20 degree incline. The drop spread rapidly over the surface of the water to form a film having a diameter of about five inches. After 20 seconds, the film was lifted from the surface of the water using a 2"×3" aluminum plate with a 30 mm diameter hole in the middle and a handle attached at one end. The film was colorless and had a thickness of about 400 angstroms. Microscopic examination of the film disclosed no pinholes having a diameter of one micron or more.

EXAMPLE '

Example 1 was repeated except that a 1:1:1:1 ratio by volume of ethyl acetate:propyl acetate:butyl acetate:pentyl acetate was employed. The resulting film had a thickness of about 400 angstroms and contained no observable holes having diameters of one micron or more.

EXAMPLE 3

Example 1 was repeated except that a polymethylmethacrylate polymer having a molecular weight of about 250,000 was used. The film was quite brittle and broke when lifted from the surface of the water.

EXAMPLE 4

Example 1 was repeated except that the polymer solution contained five percent by weight of the polymethylmethacrylate polymer. The resulting pinhole-free film had a thickness of about 350 angstroms.

EXAMPLE 5

Example 2 was repeated except that the polymer solution contained five percent by weight of the polymer. The resulting pinhole-free film had a thickness of about 350 angstroms.

As can be seen from the examples, it is necessary to use polymethylmethacrylate polymers with molecular weights, $M_w$, greater than about 250,000 or else the resulting films are too fragile to lift from the casting surface.

What is claimed is:

1. A pinhole-free, polymethylmethacrylate polymer film having a thickness of about 400 angstroms or less prepared according to the process comprising:
   (a) preparing a casting solution containing a polymethylmethacrylate polymer in a mixture of alkyl acetates;
   (b) depositing the casting solution on water to form a free-standing film; and
   (c) removing the film from the water.

2. The film of claim 1 wherein the casting solution contains about a 6:4 to about a 4:6 by volume ratio of ethyl acetate: pentyl acetate.

3. The film of claim 1 wherein the casting solution contains about a 4:4:6:6 to about a 6:6:4:4 by volume ratio of ethylacetate: propylacetate: butyl acetate: pentylacetate.

4. The film of claim 1 wherein the polymethylmethacrylate polymer has a molecular weight, $M_w$, greater than about 250,000.

5. The film of claim 1 wherein the polymethylmethacrylate polymer is present at about the three to about twelve percent by weight level in the casting solution based upon the total weight of the casting solution.

6. A pinhole-free, polymethylmethacrylate polymer film having a thickness of about 400 angstroms or less prepared according to the process comprising:
   (a) preparing a casting solution containing a polymethylmethacrylate polymer having a molecular weight, $M_w$, greater than about 250,000 at about the three to about the twelve percent by weight level based upon the total weight of the casting solution, in about a 4:6 to about a 6:4 by volume ratio of ethyl acetate: pentyl acetate;
   (b) depositing the casting solution on water to form a free-standing film; and
   (c) removing the film from the water.

7. The film of claims 1, or 6 wherein the casting solution contains about a 9:11 to about a 11:9 by volume ratio of ethyl acetate: pentyl acetate.

8. The film of claim 7 wherein the casting solution contains about a 1:1 by volume ratio of ethyl acetate: pentyl acetate.

9. A pinhole-free, polymethylmethacrylate polymer film having a thickness of about 400 angstroms or less prepared according to the process comprising:
   (a) preparing a casting solution containing a polymethylmethacrylate polymer having a molecular weight, $M_w$, greater than about 250,000 at about the three to about the twelve percent by weight level, based upon the total weight of the casting solution, in about a 4:4:6:6 to about a 6:6:4:4 by volume ratio of ethyl acetate: propyl acetate: butyl acetate: pentyl acetate;
   (b) depositing the casting solution on water to form a free-standing film; and 10. The film of claims 1 or wherein the casting solution contains about a 9:9:11:11 to about a 11:11:9:9 by volume ratio of ethyl acetate: propyl acetate: butyl acetate: pentyl acetate.

11. The film of claim 10 wherein the casting solution contains about a 1:1:1:1 by volume ratio of ethyl acetate: propyl acetate: butyl acetate: pentyl acetate.

12. The film of claims 1, 6, or 9 wherein the polymethylmethacrylate polymer has a molecular weight, $M_w$, in the range of about 500,000 to about one million.

13. The film of claims 1, 6, or 9 wherein the polymethylmethacrylate polymer is present at about the four to about the seven percent by weight level int he casting solution based upon the total weight of the casting solution.

14. The film of claim 13 wherein the polymer is present at about the five to about the six percent by weight level.

15. The film of claim 14 wherein the polymer has a molecular weight, $M_w$, in the range of about 500,000 to about 1,000,000.

16. The film of claim 13 wherein the polymer has a molecular weight, $M_w$, in the range of about 500,000 to about 1,000,000.

17. The film of claims 1, 6 or 9 wherein the casting solution contains a polymethylmethacrylate polymer at about the 80 to about the 100 percent by weight level and another polymer or polymers which are compatible in film form with the polymethylmethacrylate polymer at about the 20 to about the 0 percent by weight level based upon the total weight of the polymers dissolved in the casting solution.

* * * * *